(12) United States Patent
Ozawa et al.

(10) Patent No.: US 8,879,885 B2
(45) Date of Patent: Nov. 4, 2014

(54) INFORMATION PROCESSING APPARATUS, INFORMATION PROCESSING METHOD, AND PROGRAM

(75) Inventors: Takeshi Ozawa, Chiba (JP); Takashi Nomura, Tokyo (JP); Motofumi Itawaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1246 days.

(21) Appl. No.: 12/008,072

(22) Filed: Jan. 8, 2008

(65) Prior Publication Data

US 2008/0166106 A1 Jul. 10, 2008

(30) Foreign Application Priority Data

Jan. 9, 2007 (JP) .................................. 2007-001418

(51) Int. Cl.
| | |
|---|---|
| *H04N 5/932* | (2006.01) |
| *G11B 27/34* | (2006.01) |
| *H04N 21/435* | (2011.01) |
| *H04N 5/445* | (2011.01) |
| *H04N 21/443* | (2011.01) |
| *H04N 21/488* | (2011.01) |

(52) U.S. Cl.
CPC .......... *H04N 21/443* (2013.01); *H04N 21/4884* (2013.01); *G11B 27/34* (2013.01); *H04N 21/435* (2013.01); *H04N 5/445* (2013.01)
USPC .......................................... 386/201; 386/244

(58) Field of Classification Search
CPC ................... G06K 9/3266; G06K 2009/0711; G06K 9/00711; G06F 17/30796; G11B 27/11; G11B 27/34
See application file for complete search history.

(56) References Cited

U.S. PATENT DOCUMENTS

| | | | |
|---|---|---|---|
| 7,028,050 B1* | 4/2006 | Rose ...................................... 1/1 |
| 2004/0047589 A1* | 3/2004 | Kim ................................. 386/46 |
| 2004/0152055 A1* | 8/2004 | Gliessner et al. ............. 434/169 |
| 2005/0251832 A1* | 11/2005 | Chiueh ........................... 725/62 |
| 2007/0092203 A1* | 4/2007 | Iwata et al. ...................... 386/83 |
| 2007/0230894 A1* | 10/2007 | Kimura et al. .................. 386/35 |
| 2007/0253678 A1* | 11/2007 | Sarukkai ......................... 386/95 |

FOREIGN PATENT DOCUMENTS

| | | | |
|---|---|---|---|
| JP | 2002-279433 A | 9/2002 |
| JP | 2005-109925 A | 4/2005 |
| JP | 2005-115607 A | 4/2005 |
| JP | 2005-353213 A | 12/2005 |
| JP | 2006-129122 A | 5/2006 |
| JP | 2006-191413 A | 7/2006 |
| JP | 2006-245907 A | 9/2006 |

* cited by examiner

*Primary Examiner* — Philip Chea
*Assistant Examiner* — Carlton Johnson
(74) *Attorney, Agent, or Firm* — Wolf, Greenfield & Sacks, P.C.

(57) ABSTRACT

Disclosed herein is an information processing apparatus including: a display control section configured to display on a display section a picture based on a video signal and a caption synchronized with the picture and based on caption information attached to the video signal; and a character string information acquisition section configured to acquire character string information common to the caption information and to information related to music contents stored in a storage section, by comparing the caption information with the related information. The display control section displays on the display section the caption in which the common character string information acquired by the character string information acquisition section is highlighted in a predetermined manner.

15 Claims, 10 Drawing Sheets

FIG.3A

| AUDIO FILE ID | SONG TITLE | ALBUM ID | ARTIST ID |
|---|---|---|---|
| M01 | SONG A | AL01 | A01 |
| M02 | SONG B | AL01 | A01 |
| M03 | SONG C | AL02 | A01 |
| M04 | SONG D | AL03 | A02 |
| M05 | SONG E | AL04 | A03 |
| M06 | SONG F | AL04 | A03 |

FIG.3B

| ALBUM ID | ALBUM TITLE |
|---|---|
| AL01 | ALBUM A |
| AL02 | ALBUM B |
| AL03 | ALBUM C |
| AL04 | ALBUM D |

FIG.3C

| ARTIST ID | ARTIST NAME |
|---|---|
| A01 | ARTIST A |
| A02 | ARTIST B |
| A03 | ARTIST C |

WE WILL NOW LISTEN TO
MR.A, TODAY'S GUEST ARTIST,
SING A SONG TITLED "A" FROM
HIS LATEST ALBUM TITLED "A"

(3 LINES OF 16 CHARACTERS EACH IN JAPANESE)

THE ALBUM LIST OF
ARTIST "A" IS DISPLAYED

THE SONG TITLE LIST OF
ALBUM "A" IS DISPLAYED

REPRODUCTION STATUS OF
SONG "A" IS DISPLAYED

FIG.8

| ID | MATCHING CHARACTER STRING |
|---|---|
| A01 | ARTIST A |
| AL01 | ALBUM A |
| M01 | SONG A |

INFORMATION PROCESSING APPARATUS, INFORMATION PROCESSING METHOD, AND PROGRAM

CROSS REFERENCES TO RELATED APPLICATIONS

The present invention contains subject matter related to Japanese Patent Application JP 2007-001418 filed with the Japan Patent Office on Jan. 9, 2007, the entire contents of which being incorporated herein by reference.

BACKGROUND OF THE INVENTION

1. Field of the Invention

The present invention relates to an information processing apparatus, an information processing method, and a program to be executed by the information processing apparatus, whereby information is processed using audio information-related information (metadata) attached to audio information units each representing a song, and subtitle information (caption data) in TV broadcasting.

2. Description of the Related Art

Terrestrial digital TV broadcasting services have started in Japan. One such service currently offered is so-called one-segment broadcasting destined for mobile terminals such as cellular phones. Presented in digital format, the one-segment broadcasting service has the major advantage of providing stable, high-quality pictures of which the resolution is high enough to satisfy mobile terminal users. As such, the service is expected to gain widespread acceptance in the near future.

Today's one-segment TV broadcasting offers programs constituted not only by audio-video signal information but also by subtitle information called captions. Some of the mobile terminals compatible with one-segment broadcasting are capable of simultaneously displaying a moving picture and subtitle information based on the video signal and on caption data respectively.

[Patent Document]
Japanese Patent Document Laid-open No. 2005-353213

SUMMARY OF THE INVENTION

The present invention has been made in view of the above circumstances and provides techniques for displaying caption information in picture format along with the video signal, the captions being not merely output as typical subtitles in characters but displayed in such a manner as to provide users with more values and higher levels of convenience than before.

In carrying out the present invention and according to one embodiment thereof, there is provided an information processing apparatus including: a display control section configured to display on a display section a picture based on a video signal and a caption synchronized with the picture and based on caption information attached to the video signal; and a character string information acquisition section configured to acquire character string information common to the caption information and to information related to music contents stored in a storage section, by comparing the caption information with the related information; wherein the display control section displays on the display section the caption in which the common character string information acquired by the character string information acquisition section is highlighted in a predetermined manner.

The inventive information processing apparatus outlined above is capable of simultaneously outputting and displaying the picture derived from the video signal and the caption based on the caption information. The caption display is output in synchronism with the picture derived from the video signal.

With the storage section containing audio information units representing songs and related information as metadata about the audio information units, the information processing apparatus acquires attribute items that may be found in the related information and compares the acquired attribute items with the caption information. The comparison allows the information processing apparatus to acquire common character string information. The information processing apparatus proceeds to highlight that part of the caption which corresponds to the acquired character string information.

The highlighted caption part is made up of the acquired character string information displayed in characters. If the audio information units represent songs, then the highlighted characters in the caption may represent one of the songs stored in the storage section. Where the audio information units are to be reproduced from the storage section as music for the user's entertainment, the highlighted characters in the caption are considered to be of significant importance for the user.

That is, the inventive information processing apparatus is capable of automatically selecting and highlighting a character string of major importance from the caption displayed along with the picture of the video signal. This feature enhances the value of caption display for the user. According to an embodiment of the present invention, the highlighted part in the caption is considered to represent the user's preferences for music (audio) contents. This may well provide new possibilities of caption utilization.

BRIEF DESCRIPTION OF THE DRAWINGS

Further objects and advantages of an embodiment of the present invention will become apparent upon a reading of the following description and appended drawings in which:

FIGS. 3A, 3B and 3C are tabular views illustratively showing an audio file metadata table, an album list table, and an artist list table together with their typical entries;

FIG. 8 is a tabular view showing a typical structure of a matching character string list table together with its typical entries;

DETAILED DESCRIPTION OF THE PREFERRED EMBODIMENTS

Figure 1:
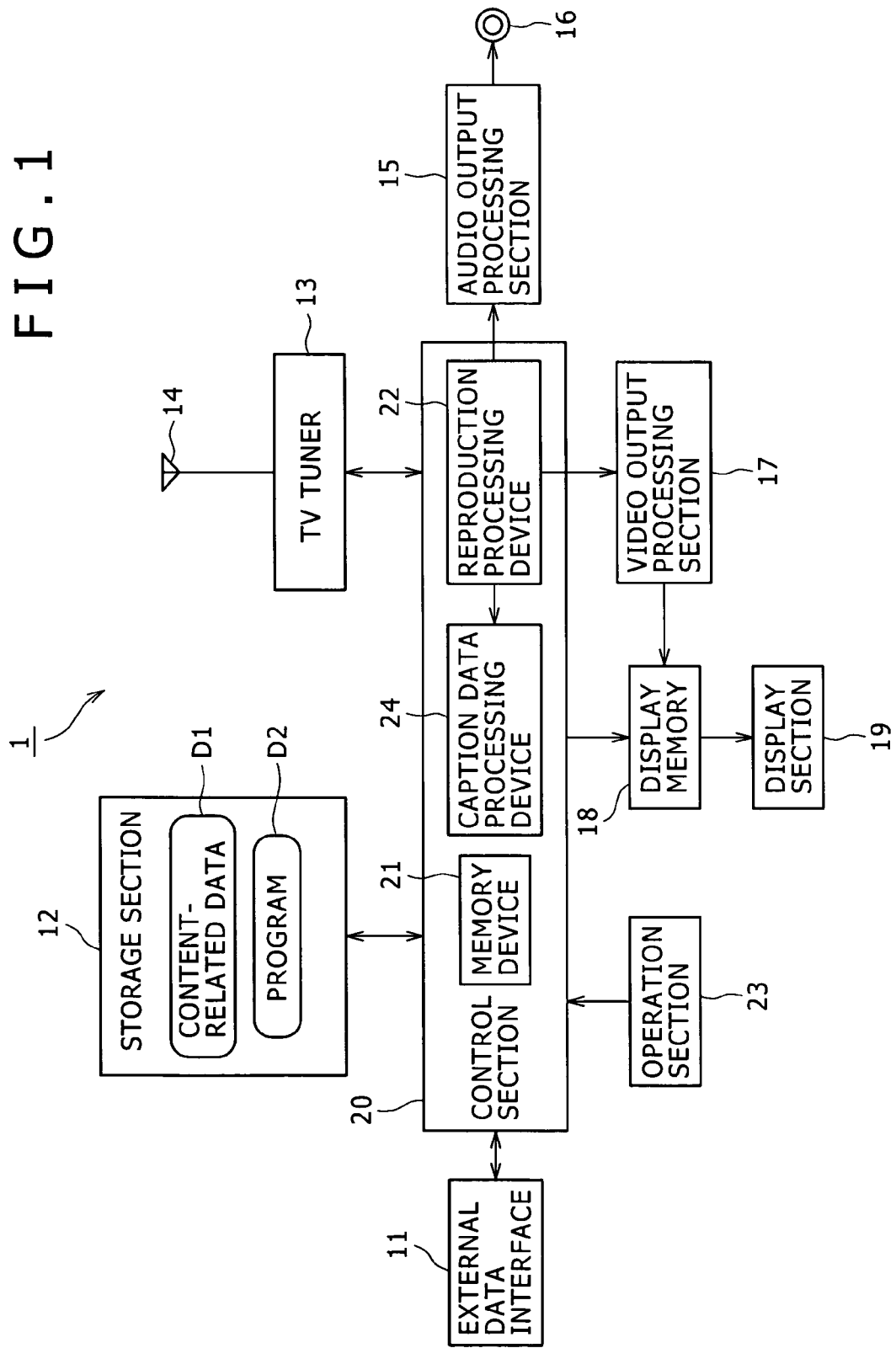
FIG. 1 is a schematic view showing a typical structure of a portable content player according to an embodiment of the present invention.

One preferred embodiment of the present invention will now be described in reference to the accompanying drawings. This is a portable content player 1 structured as an information processing apparatus according to an embodiment of the present invention.

The portable content player 1 as one embodiment of the embodiment stores and manages audio files as audio contents representing songs. In operation, the portable content player 1 reproduces and outputs the audio files for the user's enjoyment illustratively by means of headphones.

The portable content player 1 is also capable of storing, managing, reproducing and outputting video contents in the form of video files. Such video files are each made up of a moving picture and audio data synchronized therewith and are offered at least in a predetermined format.

Furthermore, the portable content player 1 according to an embodiment of the present invention can receive a type of terrestrial digital TV broadcasting called one-segment broadcasting and reproduce what is received for video and audio output. The one-segment broadcasting service, as with other digital broadcasting services, permits transmission of caption data for displaying subtitles (captions) along with the video and audio data. Digital TV broadcast receivers capable of handling caption data can decode the received caption data and convert the received data into video data that is displayed as a caption illustratively in synchronism with the main video being received and displayed. The portable content player 1 of this invention has a caption display feature for displaying caption data while one-segment broadcasting is underway.

The one-segment broadcast reception capability enables the portable content player 1 to selectively receive a one-segment broadcast station; acquire a video content composed of video, audio and caption data; and store and manage the acquired data as a video file in a predetermined format. That is, the portable content player 1 also has the ability to record the acquired video contents following selective reception from one-segment broadcast stations. The portable content player 1 is further capable of reproducing and outputting video files each constituted by a one-segment broadcast video content being stored.

In the description that follows, those video files that accommodate one-segment broadcast video contents will be referred to as recording files, and the other video files as general video files. In addition to dealing with the display of captions, the portable content player 1 according to an embodiment of the present invention can incorporate caption data into the recording file structure along with video and audio data, as will be discussed later.

It may be noted again that one-segment broadcasting is one of the terrestrial digital TV broadcasting services being offered in Japan. The terrestrial digital TV broadcasting in Japan is furnished using the ISDB (Integrated Services Digital Broadcasting-Terrestrial) system. Under the ISDB system, the 6-MHz band assigned per channel is divided into 13 segments. At present, 12 segments are used for high-definition TV broadcasting (HDTV) and four segments for standard-definition TV broadcasting (SDTV). One segment is reserved for the broadcasting service destined for mobile terminals. The broadcasting service targeted for mobile terminals is thus called one-segment broadcasting.

Currently, the picture size of the video to be transmitted by one-segment broadcasting is established as QVGA (Quarter Video Graphics Array, in 320×240 pixels). This specification provides a lower level of definition than, say, SDTV but is deemed sufficient for stable, high-quality display on a small-size display panel (e.g., 2-inch diagonal screen) of the typical mobile terminal operating digitally. Being a digital broadcast, the one-segment service permits variations of data transmission which are expected to offer new possibilities of mobile terminal utilization.

For one-segment broadcasting, H.264 (MPEG-4 AVC) is adopted as the video compression-encoding standard and AAC LC is employed as the audio compression-encoding standard.

FIG. 1 is a schematic view showing a typical structure of the portable content player 1 according to an embodiment of the present invention. In this structure, an external data interface 11 is a functional circuit that includes hardware for carrying out data communications in keeping with a predetermined data interface standard.

The standard with which the external data interface 11 complies is not limited to any particular criteria. At present, the USB (Universal Serial Bus) or IEEE 1394 may be employed. Besides the wired data interface standards, there may be adopted short-distance wireless data communication standards such as Bluetooth (registered trademark).

A storage section 12 is used primarily to accommodate content-related data D1. The content-related data D1 refers generically to audio contents (audio files), video contents (general vide files and recording files), and attribute information (metadata) about these files. The storage section 12 is one of the components that make up a control section 20.

As such, the storage section 12 also stores the data of a program D2 to be executed by a CPU (central processing unit). The control section 20 reads the data of the program D2 from the storage section 12 and loads the retrieved data into an internal RAM (memory device 21) for program execution, whereby control processing of the control section 20 is carried out.

The type of device to be adopted in practice as the storage section 12 is not limited to anything particular as long as it is a nonvolatile memory of a sufficiently large capacity which holds data when power is removed. With the current state of the art, it may be appropriate to adopt a hard disk drive (HDD) or a flash memory as the storage section 12.

The files and management information held in the storage section 12 are managed by an appropriate file system.

A TV tuner 13 is provided in connection with the one-segment broadcast reception capability. On receiving one-segment broadcasting, the TV tuner 13 at least acquires data of broadcast contents (such as video and audio data, caption data, and broadcast data). In operation, the TV tuner 13 first admits signals (receiver signals) obtained by receiving airwaves of one-segment broadcasting via an antenna 14, selects the broadcast station from which to receive the signal illustratively under control of the control section 20 set for channel designation, and acquires the receiver signal component corresponding to the designated broadcast station (i.e., channel). At this point, the control section 20 executes its controls in such a manner that the channel designated by tuning operations made illustratively on an operation section 23 will be selected. Given the receiver signal component of the designated channel, the TV tuner 13 demodulates the signal that was modulated when broadcast by the station in question, so as to obtain baseband signals for video and audio. It is assumed that video signal data and audio signal data formed by the baseband signals are compression-encoded by suitable standards.

In the case above, the video and audio baseband signals acquired by the TV tuner 13 as described are input to the control section 20. As will be discussed later, a reproduction processing device 22 inside the control section 20 writes (i.e., records) the signals to the storage section 12 or processes the signals for video and audio reproduction and output.

Where caption data is being transmitted along with the video and audio data as the broadcast content, the TV tuner 13 receives and acquires not only the video and audio data but also the caption data. The control section 20 illustratively causes the acquired caption data to be input to a caption data processing device 24. The caption data processing device 24 performs processes such that the caption data admitted in a predetermined format will be displayed as a visually recognizable caption.

The portable content player 1 according to an embodiment of the present invention typically acquires content data (audio files and video files) in the form of the content-related data D1 to be written to the storage section 12, typically as follows: of the content-related data D1, audio files and general video files (part of the video contents) are obtained from an external apparatus by way of the external data interface 11.

If the external apparatus is a personal computer, the acquisition of content data is as follows:

The user may initially connect the PC to the portable content player 1 in a manner communicable via the external data interface 11.

For the above setup, it is assumed that application software for storing and managing audio files and general video files are installed beforehand in the personal computer and that the software is started when the portable content player is connected with the PC. The user may operate the application software to select preferred audio and video files from among those under management of the software and to transfer the selected files to the portable content player 1 through the external data interface 11. It is assumed that transfer of the audio files and video files by the application software to the portable content player 1 is accompanied by the concurrent transfer of the metadata corresponding to the transferred files.

The control section 20 of the portable content player 1 acquires the audio files, video files, and metadata transferred and received through the external data interface 11 as described above. The control section 20 then converts the acquired data files to a suitable format as occasions demand before storing them into the storage section 12.

Of the content-related data D1, the video contents in the form of recording files are obtained by the TV tuner 13 that receives one-segment broadcasting. The received programs are acquired as video and audio data constituting the recording files.

That is, under control of the control section 20, the TV tuner 13 selects the broadcast station, receives the signal from the selected station, demodulates the received signal into video and audio signal data in baseband signal form, and turns the demodulated signal data into files before transferring them to the storage section 12 for storage. If the broadcast of video and audio data is accompanied by transmission of the caption data to be reproduced in synchronism with the broadcast data, then all these types of data are arranged into files by the embodiment of the invention, as will be discussed later in reference to FIG. 4.

The files stored into the storage section 12 in the above-described manner are managed as recording files by the portable content player 1.

What follows is a description of how content data is retrieved from the storage section 12 for reproduction and output by the portable content player 1 structured as shown in FIG. 1.

When an audio file is to be reproduced from among the content data retained in the storage section 12, the control section 20 first reads from the storage section 12 the audio file designated as the file to be reproduced. Inside the control section 20, the audio signal data derived from the retrieved audio file is input to the reproduction processing device 22 whereby reproduction signal processing is carried out.

The reproduction processing device 22 is a component designed to execute necessary reproduction signal processes on the audio signal data and video signal data furnished as audio and video contents respectively.

The reproduction signal processing involves initially demodulating (i.e., decompressing) the input audio signal data in accordance with the applicable compression-encoding standard, thereby obtaining a digital audio signal of an appropriate sampling frequency in suitable quantization bits. The digital audio signal thus acquired is input to an audio output processing section 15.

The audio output processing section 15 in the above setup subjects the input digital audio signal to such signal processes as sound quality and sound volume adjustments, as well as to analog-to-digital conversion and amplification. The processing brings about an audio signal for driving headphones. The resulting audio signal is output to a headphone terminal 16 that may accommodate headphones allowing the user to listen to the reproduced sound from the audio file.

Headphones are generally of the stereo/multi-channel compatible type that addresses at least the left (L) and right (R) channels. For that reason, the portable content player 1 of the present invention is structured in practice to address the multi-channel application by use of an audio reproduction signal processing section (made up of the audio reproduction processing section in the reproduction processing device 22 and of the audio output processing section 15 in particular). For purpose of simplification and illustration, however, the multiple channels will be represented by a single-channel setup to be described hereunder.

Where a video file (general video file or recording file) is to be reproduced from among the content data, the control section 20 reads the video file of interest from the storage 12 and outputs the retrieved file to the reproduction processing device 22.

As can be seen from the foregoing description, each video file is constituted by at least video signal data representing a moving picture and by audio signal data to be reproduced and output in synchronism with the picture. The video signal data and audio signal data are compression-encoded.

The reproduction processing device 22 decodes (i.e., decompresses) the video and audio signal data derived from the input video file in accordance with applicable compression-encoding standards. The decompression provides a digital video signal in a suitable format and a digital audio signal to be reproduced in synchronism with the video. The digital video signal is output to the video output processing section 17 and the digital audio signal is sent to the audio output processing section 15.

The video output processing section 17 subjects the input digital video signal to picture quality control and to conversion into display frame video data (of moving picture) as occasions demand. The display frame video data is written to a display memory 18 successively in keeping with the frame frequency in a predetermined timing.

If the video file to be reproduced is a recording file that contains caption data, then the control section 20 inputs the video file structured to contain the video signal data, audio signal data, and caption data to the reproduction processing device 22. If what has to be displayed as a caption is set with a particular display mode, then a demultiplexing capability of the reproduction processing device 22 separates the caption data from the video signal data and audio signal data and transfers the separated caption data to the caption data processing device 24.

From the input caption data, the caption data processing device 24 creates display video data constituting the caption. The display video data thus created is written to the display memory 18 illustratively in keeping with the frame frequency in a predetermined timing.

A display section 19 is composed of a display unit operating on a suitable display principle and drive circuits for driving the display. The display section 19 is driven by the drive circuits using the display video data written to the display memory 18 as described above. A display panel of the display section 19 then displays a reproduced picture of the video file in question. If the video file includes caption data and is set with a display mode for caption display, then both the main video (moving picture) based on the video signal data and the caption are reproduced and displayed simultaneously.

At the same time, the audio output processing section 15 subjects the input digital audio signal to the same signal processing as discussed above and outputs the resulting signal via the headphone terminal 16 for driving headphones. The user of the portable content player 1 according to an embodiment of the present invention can listen to the reproduced audio with headphones while watching the display panel of the player 1, thus enjoying the concurrent video and audio reproduction of the video content of interest.

As one of its one-segment broadcast-compatible features, the portable content player 1 of the embodiment permits real-time video-audio output of the video content acquired by the TV tuner 13 that selects a one-segment broadcast station and demodulates the signal received therefrom.

This feature is implemented first by inputting to the reproduction processing device 22 the video signal data and audio signal data in baseband format derived from the video content acquired by the TV tuner 13. The video signal data and audio signal data are then decoded by the reproduction processing device 22 according to applicable compression-encoding standards. Following the decoding, the video signal data is output to the video output processing section 17 and the audio signal data to the audio output processing section 15. If the caption data transmitted along with the video and audio data in a one-segment broadcast is to be displayed as well, the received caption data is input to the caption data processing device 24. From the input caption data, the caption data processing device 24 creates display video data constituting the caption. The display video data thus created is output to the display memory 18.

Thereafter, the same processes as those discussed above in connection with video file reproduction are carried out by the video output processing section 17, display memory 18, display section 19, and audio output processing section 15. The processing allows the video and audio (as well as caption if any) of a one-segment broadcast from the currently selected broadcast station to be reproduced on the display panel and through the headphones.

As is well known, digital TV broadcasting involves both main broadcast (i.e., audio and video data constituting video contents) and data broadcast being offered in a multiplexed manner. Another offering is the transmission of EPG (Electronic Program Guide) made up of information about the TV programs scheduled to be broadcast.

The portable content player 1 of the present embodiment is also capable of receiving such data broadcast and EPG data transmission and of decoding and outputting what has been received.

For example, if broadcast data or EPG data is acquired by the TV tuner 13 having received the data broadcast or EPG transmission, then the control section 20 admits the acquired data.

The control section 20 proceeds to decode the broadcast data in accordance with its data format. If the broadcast data turns out to be display data, then the control section 20 creates display video data from the decoded broadcast data and writes the display video data thus crated to the display memory 18. In turn, a picture out of the data broadcast is displayed on the screen of the display device. If the acquired broadcast data turns out to be control data for bidirectional services, then the control section 20 carries out necessary processes on the control data.

If the EPG data has been received and acquired, the data is arranged into a predetermined format before being written to a memory device 21 for storage. The memory device 21 is constituted illustratively by a DRAM, an SDRAM or the like and accommodates various kinds of data and information for use by the control section 20 (CPU) in addition to the EPG data. The CPU also loads programs into the memory device 21 for execution purposes, the memory device 21 being utilized as a work area.

Illustratively, if EPG data is set to be displayed on the display section 19 in response to the user's operations, then the control section 20 retrieves the EPG data from the memory device 21, creates display video data that would constitute a program list reflecting what was stored in the memory device 21, and writes the created display video data to the display memory 18.

In practice, the control section 20 is structurally centered on a microcomputer system that may include a CPU, a RAM (i.e., memory device 21) and a ROM as hardware. As such, the control section 20 controls the processing of the portable content player 1.

The operation section 23 includes diverse keys and other controls furnished on the portable content player 1, as well as parts that output signals (called operation signals) reflecting the operations that may be carried out on these keys and controls. Given an operation signal from the operation section 23, the control section 20 performs relevant control processing accordingly.

Figure 2:
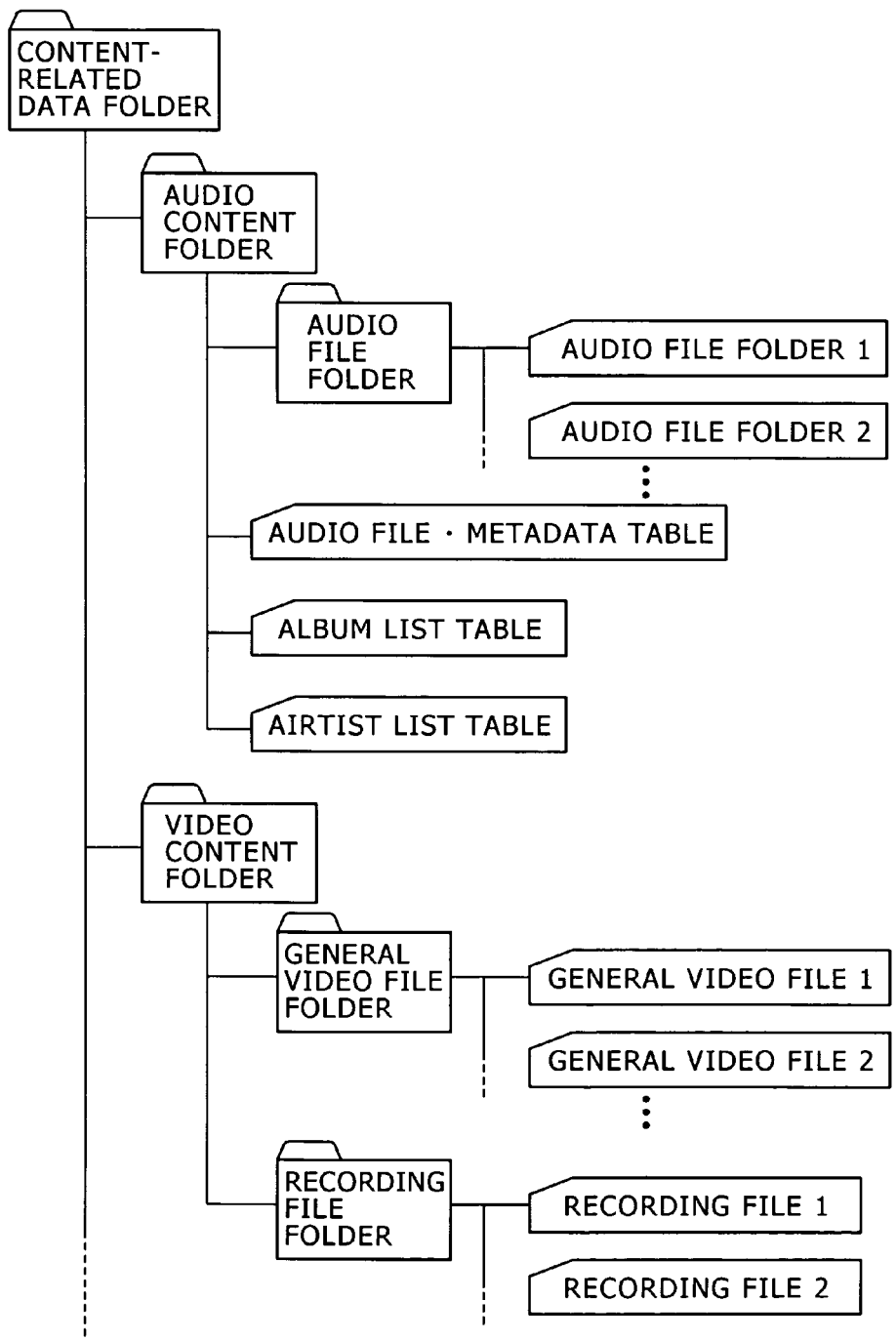
FIG. 2 is a schematic view showing a typical directory structure as well as detailed content data to be stored in that structure by the portable content player according to an embodiment of the present invention.

The content-related data D1 as part of the data stored in the storage section 12 will now be described in reference to FIG. 2. FIG. 2 schematically shows a typical directory structure in which to manage various kinds of data and their detailed files making up the content-related data D1. That is, the content-related data D1 held in the storage section 12 is managed by a suitable file system in the directory structure established illustratively as shown in FIG. 2.

The directory at the highest hierarchical level in FIG. 2 is shown accommodating a content-related data folder. This content-related data folder is placed at a predetermined level in a volume directory hierarchy of the storage section 12.

Immediately below the content-related data folder are an audio content folder and a video content folder.

Immediately below the audio content folder are typically directories for an audio file folder, an audio file metadata table, an album list table, and an artist list table.

As shown in FIG. 2, the audio file folder holds one or more audio files such as an audio file 1, an audio file 2, etc. It may be noted that, as explained above, the audio files have been acquired from the external apparatus by the portable content player 1 through the external data interface 11.

The audio file metadata table is a table composed of metadata (i.e., additional information and attribute information) about the audio files stored in the audio file folder above. Specific attribute items and their typical structures will be discussed later. The audio file metadata table is managed illustratively as a single file by the file system.

The album list table is a table formed by the listings of the albums containing songs of which the audio files are retained in the above-mentioned audio file folder. The artist list table is a table constituted by the listings of the artists playing the songs whose audio files are kept in the audio file folder.

Typical structures of the audio file metadata table, album list table, and artist list table will be discussed later.

Immediately below the video content folder are directories for a general video file folder and a recording file folder.

As shown in FIG. 2, the general video file folder accommodates one or more general video files such as a general video file 1, a general video file 2, etc.

The recording file folder holds one or more recording files such as a recording file 1, a recording file 2, etc., as illustrated.

Specific types of information belonging to the content-related data D1 and the manner of managing these types of information are not limited to what is shown in FIG. 2.

For example, general video files may be provided with metadata called general video file-ready metadata, and recording files may be furnished with metadata called recording file-ready metadata. A directory (i.e., folder) for accommodating these metadata may be included in the video content folder.

In another example, the content data may include still picture files such as photos along with audio files and video files. In this case, a still picture file folder may be added immediately below the content-related data folder so as to accommodate the still picture files.

FIGS. 3A, 3B and 3C show how the audio file metadata table, album list table, and artist list table are illustratively structured, together with their typical entries.

In the audio file metadata table of FIG. 3A, each audio file ID is associated with such attribute items as a song title, an album ID, and an artist ID making up a table list corresponding to a single audio file. Such table lists are arranged in tabular form in association with their corresponding audio files placed in the audio content folder.

An audio file ID is an identifier unique to each audio file. A song title represents the title of the song found in a given audio file. An album ID is an identifier unique to the title of the album containing the song of a given audio file. An artist ID is an identifier unique to the name of the artist playing the song of a given audio file.

Among the attribute items in FIG. 3A, audio file IDs are shown constituted illustratively by "M01," "M02," "M03," "M04," "M05" and "M06." This indicates that there exist a total of six table lists for six audio files and that the six audio files are stored in the audio file folder.

More specifically, the table list for the audio file with the audio file ID of "M01" (a single row in the table structure of FIG. 3A) shows "Song A" as the song title, "AL01" as the album ID, and "A01" as the artist ID; the table list for the audio file with the audio file ID of "M02" shows "Song B" as the song title, "AL01" as the album ID, and "A01" as the artist ID; the table list for the audio file with the audio file ID of "M03" shows "Song C" as the song title, "AL02" as the album ID, and "A01" as the artist ID; the table list for the audio file with the audio file ID of "M04" shows "Song D" as the song title, "AL03" as the album ID, and "A02" as the artist ID; the table list for the audio file with the audio file ID of "M05" shows "Song E" as the song title, "AL04" as the album ID, and "A03" as the artist ID; and the table list for the audio file with the audio file ID of "M06" shows "Song F" as the song title, "AL04" as the album ID, and "A03" as the artist ID.

The album list table in FIG. 3B is structured to have table lists each associating an album ID with an album title as attribute information. Each table list accommodates one of the album IDs found in the audio file metadata table of FIG. 3A, the corresponding album title being an attribute item indicating the title of the album identified by the album ID in question. The album list table of FIG. 3B thus includes the table lists for the four album IDs "AL01," "AL02," "AL03" and "AL04" shown in FIG. 3A.

More specifically, the table list for the album ID of "AL01" is shown to be associated with the album title of "Album A"; the table list for the album ID of "AL02" is associated with the album title of "Album B"; the table list for the album ID of "AL03" is associated with the album title of "Album C"; and the table list for the album ID of "AL04" is associated with the album title of "Album D."

The artist list table in FIG. 3C is structured to have table lists each associating an artist ID with an artist name as attribute information. Each table list accommodates one of the artist IDs found in the audio file metadata table of FIG. 3A, the corresponding artist name being an attribute item indicating the name of the artist identified by the artist ID in question. The artist list table of FIG. 3C includes the table lists for the three artist IDs "A01," "A02" and "A03" shown in FIG. 3A. More specifically, the table list for the artist ID of "A01" is shown to be associated with the artist name of "Artist A"; the table list for the artist ID of "A02" is associated with the artist name of "Artist B"; and the table list for the artist ID of "A03" is associated with the artist name of "Artist C."

Registration of new audio files into the list tables shown in FIGS. 3A, 3B and 3C (i.e., audio file metadata table, album list table, and artist list table) is accomplished illustratively when these audio files are written to the storage section 12 following their transfer via the external data interface 11 from an audio file management application program running on the external apparatus.

It is assumed that the audio file management application manages the audio files representative of songs in association with diverse kinds of metadata such as those found in the audio file metadata table, album list table, and artist list table. When the audio file management application transfers audio files as audio contents to the portable content player 1 for storage, their transfer is assumed to be accompanied by at least such attribute information as audio file IDs, song titles, album IDs, album titles, artist IDs, and artist names necessary for creating an audio file metadata table, an album list table, and an artist list table regarding the transferred audio files. The portable content player 1 creates new table lists using the attribute information received along with the audio files, and adds the newly created table lists to the existing audio file metadata table for registration. When information about a new album or a new artist has been transferred from the external apparatus, a new table list about the new album or about the artist is created and added to the album list table or to the artist list table for registration.

In the description that follows, the audio file metadata table, album list table, and artist list table may be generically referred to as audio file management information where appropriate.

Figures 4, 5:
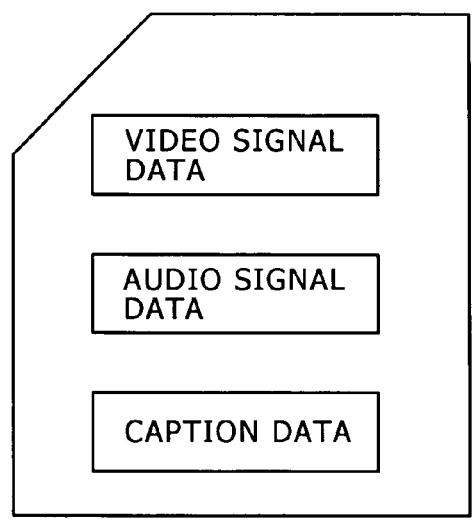
FIG. 4 is a schematic view showing a typical structure of a recording file.
FIG. 5 is a schematic view showing a typical format of caption data.

FIG. 4 schematically shows a typical structure of a recording file to be stored in the storage section 12 and managed by the portable content player 1 of the embodiment. As mentioned above in reference to FIG. 1, the recording file is composed of video signal data, audio signal data, and caption data if any. The video signal data constitutes a moving picture and the audio signal data represents the audio to be reproduced in synchronism with the moving picture. Optionally, the caption data may be multiplexed in the recording file by the broadcast station upon transmission of the file. The video signal data, audio signal data, and caption data are arranged into a single recording file of a predetermined structure as shown in FIG. 4.

FIG. 5 schematically shows a typical format of caption data.

As illustrated, the caption data is generally in a text data format with three lines of 16 characters each (in Japanese). Alternatively, the caption data may be in a text data format with four lines of 12 characters each (in Japanese).

As can be understood from the foregoing description, the portable content player 1 of the present embodiment is capable of acquiring broadcast contents upon receipt of a one-segment broadcast in real time and outputting the video and audio representative of the acquired broadcast contents. The portable content player 1 is also capable of storing the broadcast contents into the storage section 12 and retrieving the contents therefrom for video and audio reproduction. If caption data is found included in a broadcast content or in a recording file, the portable content player 1 can display the caption derived from the caption data along with the main video of the content.

The caption displayed as explained above generally has the objective of presenting in characters an explanation of the simultaneously displayed main video or the lines of a protagonist or others speaking on the scene, in order to help the user better understand what is being displayed as the program. In addition to that ordinary feature, the embodiment of the present invention offers a GUI (Graphical User Interface) capability whereby captions are presented to the user more conveniently at higher values of utilization than before. How this capability is implemented will be described below.

Figure 6A:
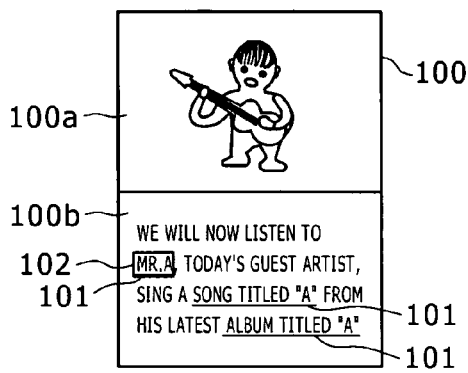
FIGS. 6A through 6F are schematic views explanatory of how a TV program is displayed as a TV content and how switchover is typically performed from the TV content display to a user interface display for audio file-related operations.

FIG. 6A shows a display screen 100 of the display section 19 found in FIG. 1. The display screen 100 is a vertically oriented screen with a predetermined length-to-width ratio. When the portable content player 1 of the embodiment displays the moving picture (main video) of a broadcast content or a recording file along with the caption derived from caption data, the player 1 illustratively divides the display screen 100 into an upper and a lower display area. Typically, the upper area serves as a main video display area 100*a* and the lower area as a caption display area 100*b*. The main video display area 100*a* may display the main video as moving pictures whereas the caption display area 100*b* may indicate captions in synchronism with the main video.

In the ensuing description, it is assumed that the management information regarding the audio files stored in the portable content player 1 (i.e., audio file metadata table, album list table, and artist list table) is made up of what is shown in FIGS. 3A, 3B and 3C. Furthermore, if broadcast contents and recording file contents need not be distinguished from one another, they may be generically referred to as TV contents because they derive from the common source of TV broadcasting.

Illustratively, the caption display area 100*b* in FIG. 6A shows a caption composed of a character string saying, "We will now listen to Mr. A, today's guest artist, sing a song titled 'A' from his latest album titled 'A'." The caption data serving as the basis for this caption is text data representative of the characters making up the character string.

Normally, the displayed caption is a simple representation in characters of the text data furnished as caption data. With this embodiment, the character string constituting the whole caption is partially highlighted as illustrated (i.e., supplemented by underlined displays 101).

In the character string of the caption in FIG. 6A, the highlighted parts are "Artist A," "Album A," and "Song A." "Artist A" is found in the artist list table of FIG. 3C as the attribute item corresponding to the artist ID of "A01." "Album A" is found in the album list table of FIG. 3B as the attribute item corresponding to the album ID of "AL01." "Song A" is found in the audio file metadata table of FIG. 3A as one of the attribute items corresponding to the audio file ID of "M01."

That is, on its display screen, the embodiment of the invention highlights those parts of the character string constituting the caption which are among the items found in the audio file metadata table, album list table, and artist list table, using underlined displays 101. The highlighted parts of the character string match some of the attribute items of song titles, artist names, and album titles listed in the tables.

The manner in which to highlight parts of the character string is not limited to underlining. Any of other suitable alternative methods may be adopted. Illustratively, the characters of the string part to be highlighted may be displayed in a different color, in a different font size, or in a different style (e.g., italics) from that of the other characters in the character string. As another alternative, the character string part to be highlighted may be furnished with predetermined ornaments.

The audio files stored in the storage section 12 have been transferred from the personal computer or the like by the user's operations as discussed above. It is then reasonably assumed that the songs of the stored audio files are songs preferred by the user. The above-described audio file management information (audio file metadata table, album list table, artist list table) is management information about the audio files kept in the storage section 12. The attribute items of the song titles, artist names, and album names listed in the tables are supposed to represent the user's preferences. Thus the highlighted parts of the character string in the caption display area 100*b* of FIG. 6A point to some of the song titles, artist names or album titles preferred by the user.

In the manner described above, on its display screen, the embodiment of the invention highlights those parts of the character string which are assumed to denote some of the song titles, artist names, or album titles preferred by the user. While the user is viewing the TV content video on the display screen 100 in a more or less desultory manner, a highlighted part in the caption is highly likely to draw the user's attention. Illustratively, the user is alerted to the start of a TV program that may involve a song, an artist, or an album to his or her taste; the user is spared of missing out on an interesting program offering.

The embodiment of this invention provides a so-called link capability regarding the underlined displays 101 for highlighting parts of the caption.

A cursor 102 is shown in the caption display area 100*b* of FIG. 6A. The cursor 102 can be moved by the user's operations between those parts of the character string which are highlighted by the underlined displays 101. In FIG. 6A, the cursor 102 is shown to be overlaid on the character string part of "Artist (named) A."

Figure 6B:
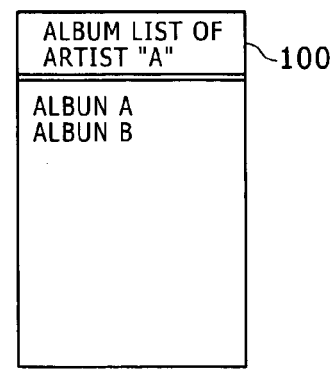

Suppose that with the cursor 102 positioned as shown in FIG. 6A, the user performs an operation to finalize the cursor position. In that case, the display screen 100 is switched from the current TV content video display to an album list display about the artist A as shown in FIG. 6B. Reflecting what is contained in the audio file management information in FIGS.

3A, 3B and 3C, the album list of FIG. 6B indicates "Album A" (album ID=AL01) including song A and song B performed by the artist A (artist ID=A01), and "Album B" (album ID=AL02). This kind of album list is one of the user interface video displays designed for audio file reproduction. Illustratively, the user may select one of the album titles from the album list and proceed to have a list of the songs contained in the album displayed.

Figure 6C:
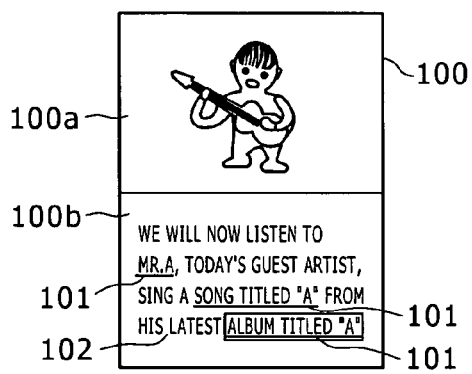

It might also happen that with the cursor 102 positioned on the character string part of "Album (titled) A" as shown in FIG. 6C, the user performs an operation to finalize the cursor position. In that case, the display screen 100 is switched to the display of FIG. 6D, another user interface video display for audio file reproduction.

The display shows a list of the song titles contained in the album A. Reflecting what is contained in the audio file management information in FIGS. 3A, 3B and 3C, the song title list of FIG. 6D indicates the titles A and B of the songs performed by the artist A (artist ID=A01). Illustratively, the user may carry out operations to select a desired song title from the song title list for reproduction and output of the preferred song.

Figure 6D:
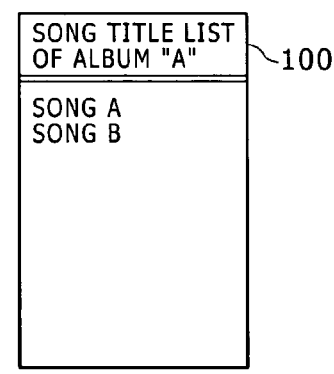
Figure 6E:
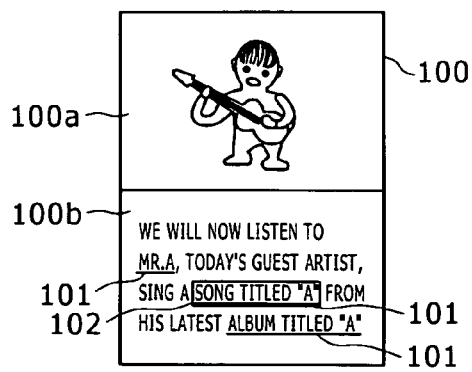

In another example, with the cursor 102 positioned on the character string part of "Song (titled) A" as shown in FIG. 6E, the user may perform an operation to finalize the cursor position for reproduction and output of the audio file of "Song A". In that case, the display screen 100 is switched to the display of FIG. 6F, a picture indicating reproduction status of the song A.

Described below are some technical arrangements of the embodiment for implementing the caption display including highlighted character string parts, and for bringing about the links from the highlighted parts to relevant user interface video displays for audio file reproduction.

Figure 7:
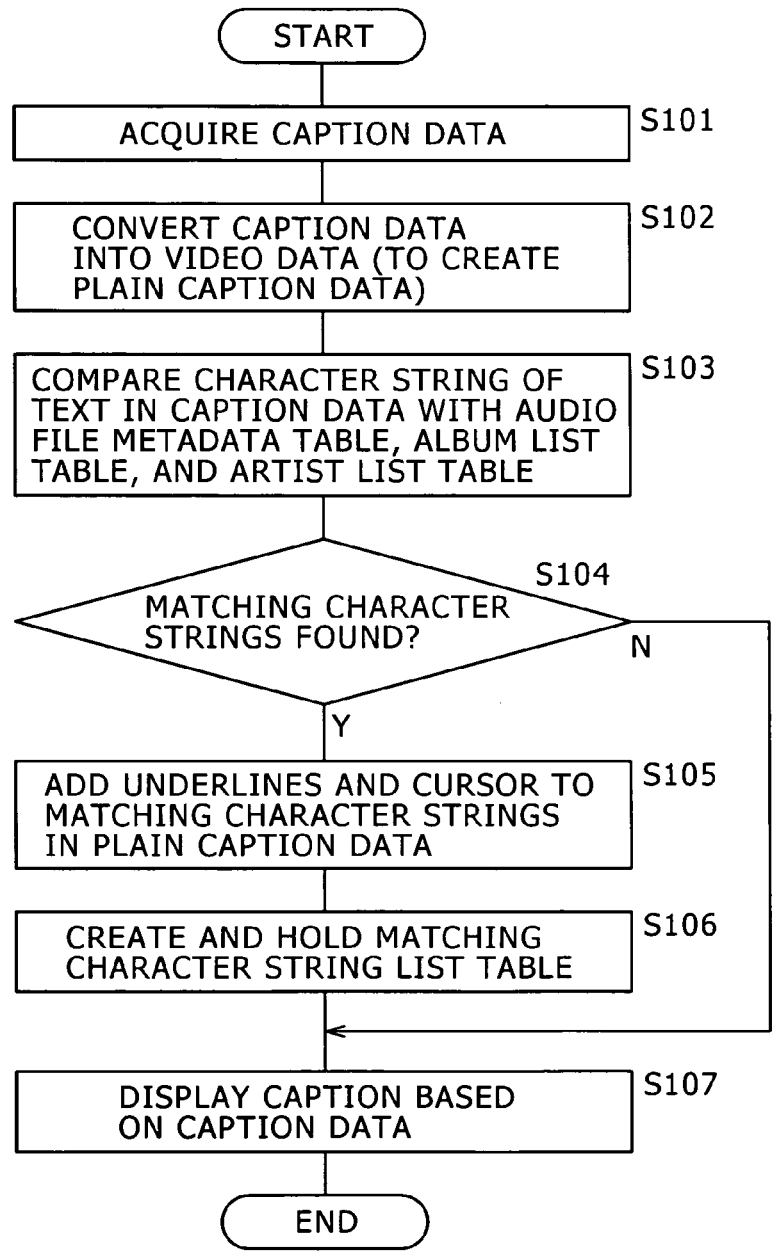
FIG. 7 is a flowchart of steps constituting a procedure for displaying a caption with the embodiment.

Described first in reference to the flowchart of FIG. 7 is a typical procedure for highlighting character string parts of the caption being displayed. The procedure of FIG. 7 is typically carried out when display mode is set to provide caption display in one of two cases: during output of the video and audio of a broadcast content acquired by the TV tuner 13 that has selecting a one-segment broadcast station for reception; or during reproduction and output of the video and audio of a recording file. It is assumed here that the broadcast content being output has been transmitted with caption data multiplexed therein and that the recording file being reproduced includes caption data effective for the format in which the file is structured.

In step S101 of FIG. 7, caption data is acquired anew. In the case of the broadcast content, new caption data is consecutively transmitted to keep up with the changes in the main video of the ongoing TV program. In the case of the recording file, the new caption data is retrieved successively in keeping with the changes in the main video being reproduced. That is, for the broadcast content, step S101 involves acquiring by extraction the newly transmitted caption data from the information that has been received and acquired. For the recording file, step S101 entails extracting the caption data from information retrieved from the storage section 12.

In step S102, caption video data is created illustratively by the caption data processing device 24 using the caption data acquired as described above. The created caption video data represents in characters the text constituted by the acquired caption data. Thus, the display video data is created. What is created in step S102 as the caption video data amounts to basic caption video data devoid of such additions as the underlined displays 101 or the cursor 102. The basic caption video data may be called plain caption data in the ensuing description.

In step S103, the character string making up the text represented by the caption data acquired in step S101 above is compared successively with attribute information as follows:

A comparison is first made between the character string of the caption data on the one hand, and the attribute items of the song titles in the table lists constituting the audio file metadata table on the other hand. If the attribute items of the song titles are not found to be stored in text form, the data may have to be converted beforehand to a text so as to enable the comparison with the caption data.

Another comparison is made between the character string of the caption data on the one hand, and the attribute items of the album names in the table lists making up the album list table on the other hand. A further comparison is made between the character string of the caption data on the one hand, and the attribute items of the artist names in the table lists constituting the artist list table on the other hand.

In step S104, checks are made to determine whether the comparisons in step S103 have revealed any matching attribute item from among the song titles, album titles, and artist names in the character string of the caption data.

If any matching attribute item is found in step S104, then step S105 is reached.

In step S105, a video-related process is performed in a manner adding underlined displays 101 to those character string parts which are found in step S104 to match in the character string of the plain caption data obtained in step S102 above. At the same time, another process is carried out to position the cursor 102, by predetermined rules, to one of the selected character string parts supplemented by the underlined displays 101 (for example, the rules may stipulate that the first character string part furnished with the underlined display 101 be selected for cursor positioning). These processes provide video data serving as the basis for creating illustratively caption video shown in the caption display area 100b of FIG. 6A.

In step S106 following the video processing of step S105, a matching character string list table is created and placed into the memory device 21 for storage.

FIG. 8 shows a typical structure of the matching character string list table together with its typical entries. As shown in FIG. 8, the matching character string list table is made up of table lists constituted by the character string parts found to match in step S104 (i.e., matching character string parts), and by the IDs of those song titles, artist names, or album names (i.e., audio file IDs, artist IDs, and album IDs) which correspond to the matching character string parts.

What is contained in the matching character string list table of FIG. 8 corresponds to the case of FIG. 6A as caption video display. FIG. 6A shows the character string parts of "Artist A," "Album A," and "Song A" highlighted. This signifies that there exist in the character string of the caption data those parts which correspond to "Artist A," "Album A," and "Song A." According to FIGS. 3A through 3C, the artist ID for "Artist A" is A10, the album ID for "Album A" is AL01, and the audio file ID for "Song A" is M01. The matching character string list table is then constituted by the table list in which the character string part of "Artist A" is matched with the ID of "A01," by the table list in which the character string part of "Album A" is matched with the ID of "AL01," and by the table list in which the character string part of "Song A" is matched with the ID of "M01."

The matching character string table list thus organized and retained will be used for implementing the link capability whereby highlighted character string parts are linked to other functions, as will be discussed later in reference to FIG. 9.

Following the execution of step S106, step S107 is reached. If the result of the check in step S104 is negative, with no matching part found in the character string, then steps S105 and S106 are skipped and step S107 is reached.

In step S107, a process is executed to get the caption displayed in the caption display area 100b on the basis of the caption video data that has been created and retained. This process is carried out by having the caption video data transferred to the display memory 18 in a suitably timed manner.

If step S107 is reached by way of steps S105 and S106, then the caption is displayed with the matching parts highlighted by underlined displays 101 in the character string of the caption. If step S107 is reached with steps S105 and S106 skipped, then the caption is displayed on the basis of the plain caption data. That is, the character string appears free of any underlined displays 101. This means that the character string of the caption contains no string parts that would match the attribute items of the song titles, artist names, or album titles in the audio file management information.

Figure 9:
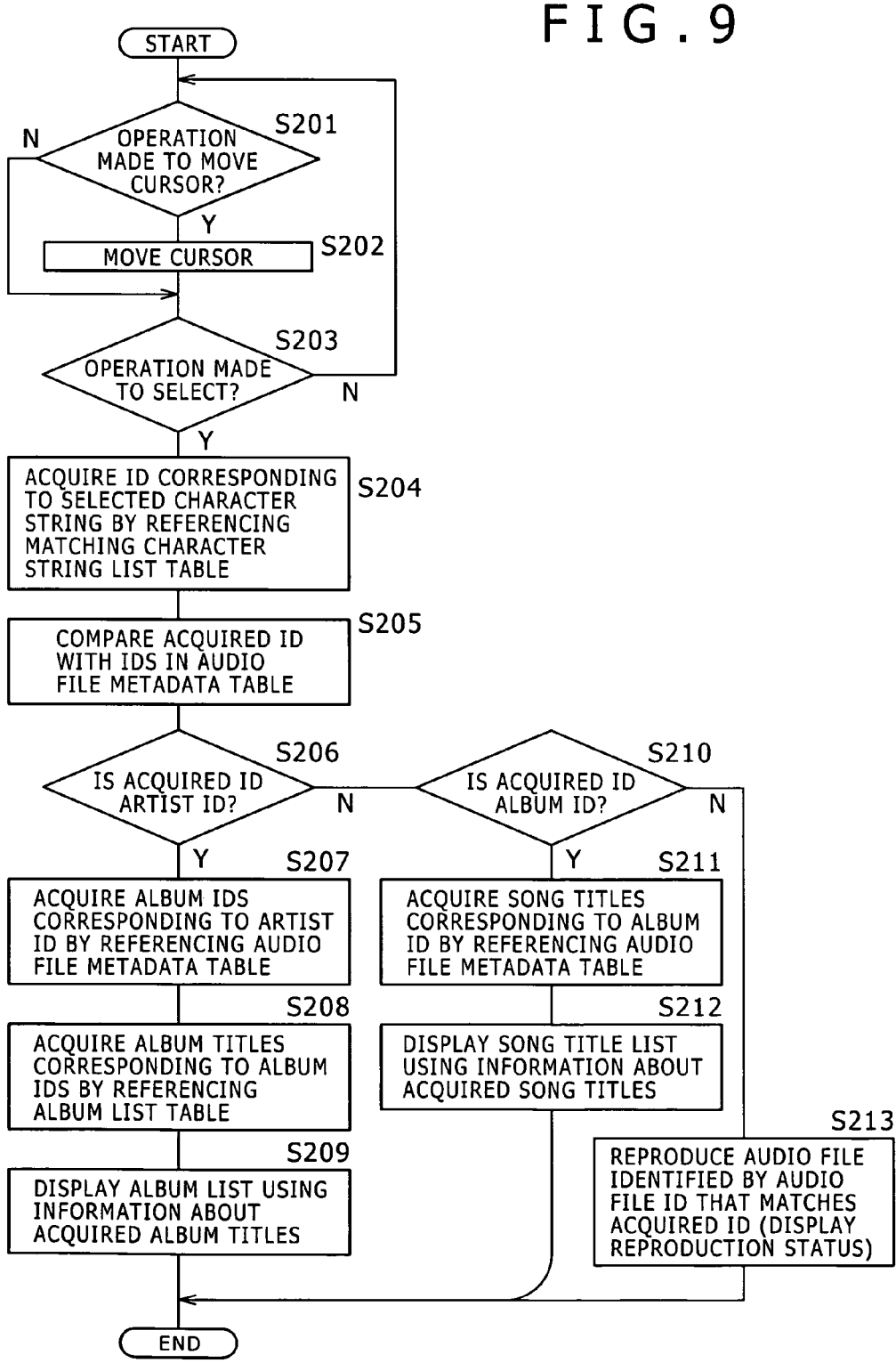
FIG. 9 is a flowchart of steps constituting a procedure for performing operations on a displayed caption.

Described below in reference to the flowchart of FIG. 9 is a procedure for performing operations to invoke user interface video displays linked to the highlighted parts of the character string in connection with audio file reproduction. The processing of FIG. 9 is carried out when a TV content video and a caption display appear simultaneously as shown in FIGS. 6A, 6C and 6E.

In step S201 of FIG. 9, a check is made to determine whether any operation is carried out on the operation section 23 to move the cursor 102 over the caption being displayed. If the result of the check in step S201 is negative, then step S203, to be discussed later, is reached. If the result of the check in step S201 is affirmative, then step S202 is reached.

In step S202, a process is performed to move the cursor to another highlighted character string part as instructed by the operation carried out in step S201. Step S202 is followed by step S203.

In step S203, a check is made to determine whether any operation is carried out to select the character string part being pointed to by the cursor 102. If the result of the check in step S203 is negative, then step S201 is reached again. If the result of the check in step S203 is affirmative, then step S204 is reached.

In step S204, the matching character string list table is referenced in such a manner as to acquire the ID associated with the character string part selected in step S203. For example, suppose that with the character string part of "Artist A" highlighted as shown in FIG. 6A, an operation is carried out to select that string part. In that case, the artist ID of "A01" associated with the matching character string part of "Artist A" is acquired by referencing the matching character string list table indicated in FIG. 8.

In step S205, comparisons are made between the ID acquired in step S204 on the one hand (referred to as the acquired ID here), and the IDs held in the audio file metadata table (i.e., artist IDs, album IDs, audio file IDs) stored in the storage section 12 on the other hand.

Following the comparisons in step S205, step S206 is reached and a check is made to see if any one of the artist IDs matches the acquired ID. If the result of the check in step S206 is affirmative, then step S207 is reached.

If the result of the check in step S206 is affirmative, that means the acquired ID is one of the artist IDs. In this case, step S207 is reached and all album IDs associated with the artist ID thus acquired are obtained by referencing the audio file metadata table. Illustratively, if the acquire ID is the artist ID of "A01" identifying the artist A, then two album IDs "AL01" and "AL02" are obtained in step S207.

In step S208, the album titles associated with the album IDs acquired in step S207 are obtained by referencing the album list table. If the album IDs are illustratively "AL01" and "AL02" as mentioned above, then the album titles of "Album A" and "Album B" are acquired in step S208.

In step S209, a process is performed to display and output an album list regarding the artist identified by the acquired ID through the use of the album titles obtained in step S208. For that purpose, the control section 20 may create display video data constituting a picture of the album list showing the acquired album titles typically in text. Then, by transferring the display video data to the display memory 18, a video image is displayed by the display section 19. The above processes illustratively amount to the transition from the video of FIG. 6A to the display of FIG. 6B; the switchover from the TV content video display to the album list display about the artist A is now accomplished.

If the result of the check in step S206 is negative, then step S210 is reached. In step S210, a check is made to determine whether any one of the album IDs matches the acquired ID. If the result of the check in step S210 is affirmative, then steps S211 and S212 are reached and carried out successively.

The affirmative result of the check in step S210 means that the acquired ID is one of the album IDs. In that case, step S211 is reached and all song titles associated with the acquired album ID are obtained by referencing the audio file metadata table. For example, if the acquired ID is the album ID of "AL01," then two song titles A and B are obtained in step S211. In step S212, a process is carried out using the acquired song titles so as to display a song title list of the songs contained in the album identified by the acquired album ID. These processes amount to the transition illustratively from the video of FIG. 6C to the list display of FIG. 6D.

If the result of the check in step S210 is negative, that means the acquired ID is one of the audio file IDs. In that case, step S213 is reached and a process is carried out to reproduce and output the audio file identified by the audio file ID matching the acquired ID following retrieval of the file from the storage section 12. At the same time, another process is performed to display reproduction status of the ongoing audio file reproduction. These processes provide the transition illustratively from the video of FIG. 6E to the reproduction status display of FIG. 6F.

Figure 6F:
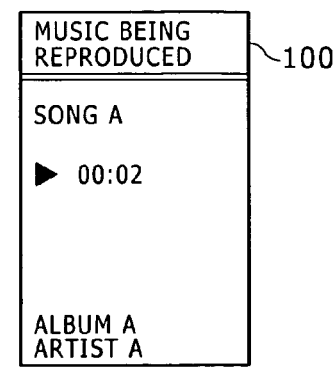

Following the transition from the TV content video display of FIG. 6A, 6C or 6E to the user interface video display for audio file operations shown in FIG. 6B, 6D or 6F, the user may presumably perform operations to return to the initial TV content.

If that is the case and if the broadcast content is a TV content, then one of the specifications that may be reasonably implemented here may involve bringing back the same channel (i.e., broadcast station) as that in effect before the transition from the TV content video display to the user interface video display for audio file operations, so that the video and audio currently broadcast over that channel will be output.

One drawback of the above arrangement, however reasonable it may be, is that the user will miss out on the broadcast content that went on while the user interface video display was being output for audio file operations. Since the broadcast content is transmitted in real time, it is difficult to view the missed portion of the broadcast program at a later time as in the case of recording files.

This embodiment bypasses the above difficulty as follows: when the switchover from the broadcast content display (along with the audio output) to the user interface video display for audio file operations is followed by a return, on the user's order, to the initial broadcast content display (i.e., the same channel as before), the initial broadcast content is resumed where it was left off for the switchover to the user interface video display for audio file manipulations. This feature allows the user to start viewing that supposedly lost portion of the broadcast content which was being broadcast while the user interface video display was in effect. In the ensuing description, this feature of letting the initial broadcast content be output again from where it was left off by the switchover described above will be referred to as the broadcast content resume function.

Figure 10:
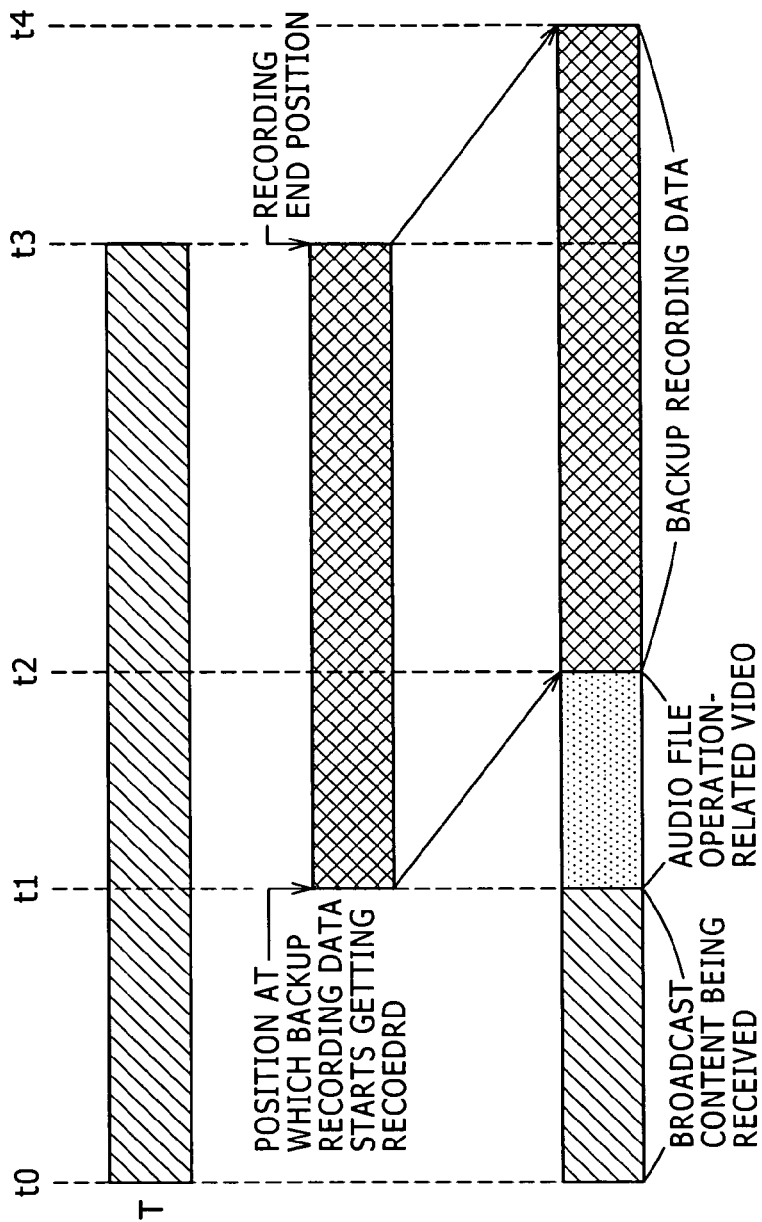
FIGS. 10A, 10B and 10C are schematic views explanatory of the ability of the embodiment to resume a broadcast content.

FIGS. 10A, 10B and 10C schematically depict how the portable content player 1 of the invention typically works to implement the broadcast content resume function.

FIG. 10A schematically shows overtime how a broadcast content is received and acquired in real time by the portable content player 1 from the selected broadcast station. The broadcast content shown in FIG. 10A is illustratively a TV program which starts at time t0 and ends at time t3 and which has caption data multiplexed therein.

FIG. 10C schematically shows typical transition of displays on the display screen 100 over time.

As illustrated, the portable content player 1 allows the user to selectively receive the channel on which the TV program of FIG. 10A is being broadcast and to have the video of the broadcast content displayed starting from time to together with output of the audio of the content. It is assumed that the display screen 100 displays a caption in addition to the main video of the TV program as shown in FIG. 6A, 6C or 6E.

It might happen that at time t1 after the elapse of a certain time period from time to, the user finalizes the cursor position on the displayed caption as discussed above in reference to FIGS. 6A through 6F. In that case, as shown in FIG. 10C, the display screen 100 is switched from the ongoing broadcast content display to an interface video display (e.g., FIG. 6B, 6D or 6F) for audio file operations in accordance with the highlighted character string part having been pointed to by the cursor 102.

After the switchover at time t1 from the display of the currently received broadcast content to the interface video display for audio file manipulations, the ongoing reception and acquisition of the broadcast content are allowed to continue. The broadcast content data acquired after time t1 (video, audio, and caption data) is written continuously to the storage section 12 as backup recording data.

At time t2 after the elapse of a predetermined time period from time t1, the user is assumed to perform operations to return to the channel of the same broadcast content as before time t1 (i.e., initial broadcast content). In response, the backup recording data is arranged to start getting reproduced at time t2 from the beginning of the recording (i.e., from the recording start position) for video and audio output, as shown in FIGS. 10B and 10C. After time t2 of FIG. 10C, reproduced pictures derived from the backup recording data are displayed as illustrated.

The above switchover between displays makes it possible to connect the received broadcast content ending at time t1, with the reproduction of the backup recording data starting at time t2, as shown in FIG. 10C. As explained, if the previously received but halfway interrupted broadcast content is subsequently resumed from where it was left off for switchover to the user interface video display or the like, the broadcast content can be started for viewing from the point where it was interrupted earlier.

In the example outlined in FIGS. 10A through 10C, recording of the backup recording data is brought to an end at a program end time. That is, as shown in FIG. 10B, the recording of the backup recording data is terminated at time t3. If the reproduction and output of the backup recording data are continued after time t2, then the backup recording data may be reproduced and output continuously until time t4 at which the backup recording data ends. After the reproduction of the backup recording data is terminated at time t4, the display screen 100 may be arranged to display what is currently broadcast on the same channel from which the backup recording data was acquired.

Although not shown, interrupted reproduction of the recording file of a TV content may be resumed using a function similar to the above-described broadcast content resume function.

That is, suppose that the reproduction of a recording file with its video displayed as shown in FIG. 6A is interrupted halfway, followed by switchover to an interface video display associated with audio file operations and that the same recording file is subsequently resumed after the switchover. In that case, the halfway-interrupted recording file is not resumed from the beginning but from where it was left off for the switchover to the audio file-related interface video display.

In the manner described above, the embodiment of the invention also provides the function of resuming the reproduction of an interrupted recording file of a broadcast TV content as in the case of broadcast contents (the function is called the TV content resume function).

Figure 11:
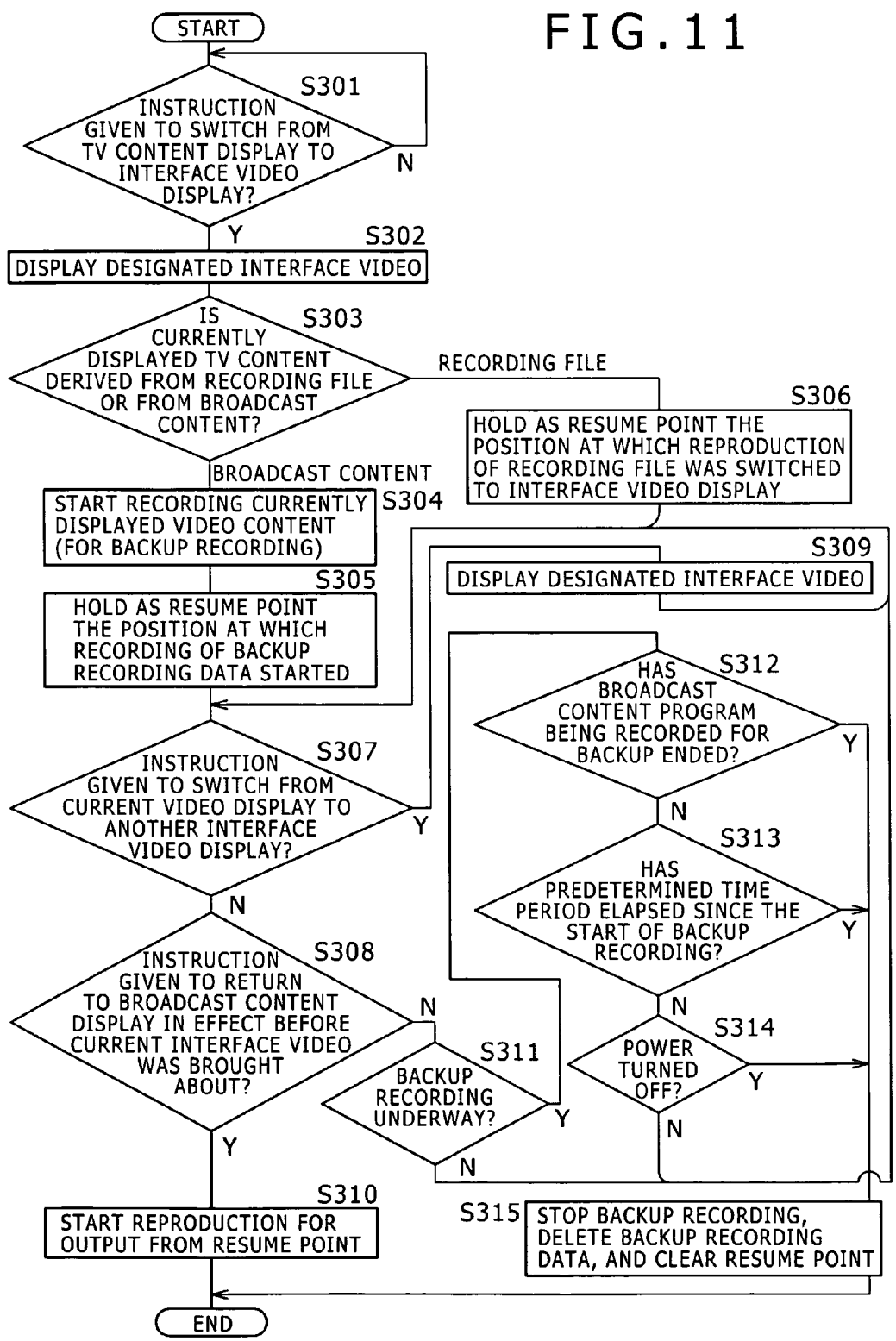
FIG. 11 is a flowchart of steps constituting a procedure for implementing the ability of the embodiment to resume a TV content.

The flowchart of FIG. 11 outlines a typical procedure performed by the embodiment of the invention for implementing the TV content resume function discussed above in reference to FIGS. 10A through 10C.

In step S301 of FIG. 11, a check is made to determine whether an instruction is given to switch illustratively from the TV content display to a user interface video display. The check is repeated until the instruction is detected. When the user performs, say, operations to finalize the cursor position on the displayed caption, the instruction is deemed given so as to switch from the TV content display to a predetermined user interface video display for audio file operations (e.g., as discussed above regarding switchover from FIG. 6A to FIG. 6B, from FIG. 6C to FIG. 6D, or from FIG. 6E to FIG. 6F). Then step S302 is reached.

In step S302, a process is performed to display on the display screen 100 the user interface video display designated in response to the result of the check in step S301. Step S302 is followed by step S303.

In step S303, a check is made to determine whether the TV content displayed until the switchover instruction was given in step S301 is a recording file or a broadcast content. If the TV content is found to be a broadcast content, then step S304 is reached.

In step S304, a process is started to record the data of the broadcast content displayed so far to the storage section 12 for storage. That is, the backup recording discussed in conjunction with FIG. 10B is started.

This embodiment of the invention presupposes that what may be called a resume point is defined for use with its TV content resume function. The resume point is a temporal position of content reproduction (i.e., data position) at which the switchover is made from the display of the currently offered TV content (broadcast content or recording file) to the user interface video display and at which the output of the same TV content display may be subsequently restarted from where it was left off.

In step S305, the position at which the writing of the backup recording data to the storage section 12 was started in step S304 is retained as the resume point. In practice, the resume point may be defined illustratively as the address from which the backup recording is started on the storage section 12 serving as a recording medium. Step S305 is followed by step S307.

If in step S303 the displayed TV content is found to be a recording file, then step S306 is reached.

In step S306, the position at which the reproduction of the recording file was switched to the currently displayed user interface video in step S302 is retained as the resume point. This resume point may be defined as the address at which the reproduction of the recording file was interrupted on the recording medium in use.

Step S306 is followed by step S307.

By the time step S307 is reached, the TV content display such as one in FIG. 6A, 6C or 6E has been replaced by the user interface video display for audio file operations such as one shown in FIG. 6B, 6D or 6E. In step S307, a check is made to determine whether an instruction is given to switch from the current user interface video display to another user interface video display (or some other content video output other than the initial TV content). The instruction is deemed to be given illustratively when the selection of an album title from the album list of FIG. 6B is followed by the switchover to the display of a list of the song titles contained in the selected album as described above.

If the instruction is found to be given in step S307, then step S309 is reached. In step S309, a process is performed to switch the display screen 100 to the designated user interface video display (or a content video display other than the initial TV content). After step S309, control is returned to step S307.

If in step S307 no such instruction is found to be given, then step S308 is reached.

In step S308, a check is made to determine whether an instruction is given to restore the broadcast content display that was in effect until the switchover to the current user interface video display. If the result of the check in step S308 is affirmative, then steps S310 and S311 are reached and carried out.

In step S310, the start of reproduction of the video content file is designated by specifying that address on the storage section 12 which is defined as the currently retained resume point. If step S310 is reached by way of step S305, then the resume point indicates the position at which the backup recording was started. In that case, the backup recording data is reproduced and output from the beginning in step S310. On the display screen 100, the video of the TV content broadcast and received after time t1 is displayed starting from time t2. In this manner, the broadcast content is resumed for output.

If step S310 is reached by way of step S306, then the resume point indicates a halfway position of the data constituting the recording file. In this case, reproduction of the recording file is started from that data position. The display screen 100 then displays the video of the recording file that is again reproduced starting from the position at which the reproduction was interrupted (i.e., stopped) earlier for switchover to the current user interface video display. This is how the recording file is resumed for output.

For the above steps, the resume point signifies solely a reproduction start position on the recording medium. That is, the resume point is shared by both the recording file and the backup recording data, and not specific to either of them. There is no need to retain information constituting the positions of the resume points separately for the recording file and the backup recording data.

If the result of the check in step S308 is negative, that means no instruction is given to switch from the current user interface video display following the switchover from the TV content video display, to another user interface video display or to the initial TV content display (output). In such a case, step S311 is reached.

In step S311, a check is made to determine whether the backup recording is currently underway. If the result of the check in step S311 is negative, then step S307 is reached again. If the result of the check in step S311 is affirmative, then step S312 is reached.

Steps 312, S313 and S314 represent the conditions for ending the recording of the backup recording data which was started in step S304.

In step S312, a check is made to determine whether the program end time of the broadcast content being recorded as the backup recording data is reached. If the result of the check in step S312 is affirmative, then step S314 is reached and the backup recording is terminated. Also in step S315, the backup recording data having been recorded so far on the storage section 12 is deleted and the retained information representing the resume point is cleared.

In step S313, a check is made over time to determine whether a predetermined time period has elapsed since the beginning of the backup recording, the time period being long enough to justify a conclusion that the user will not return to the initial broadcast content. If the predetermined time period is found to have elapsed, then step S315 is reached and the backup recording is terminated as described.

In step S314, a check is made to determine whether the main power supply of the portable content player 1 is turned off. If in step S314 the portable content player 1 is found to be switched off, then step S315 is reached.

Although the backup recording data was shown to be deleted in step S315 upon termination of the backup recording, this is not limitative of the present invention. Alternatively, the backup recording data may be retained and managed in the form of a recording file.

It is assumed as explained earlier that the programs to be executed by the CPU of the control section 20 for carrying out the steps in the flowcharts of FIGS. 7, 9 and 11 above are stored beforehand on the storage section 12. Alternatively, the programs may be installed from, say, a personal computer connected via the data interface 11 and written to the storage section 12. As another alternative, the portable content player 1 may be furnished with a suitable drive that accommodates removable storage media from which the programs may be retrieved and written to the storage section 12. As a further alternative, the programs may be retained in a server on the network and downloaded therefrom for installation into the portable content player 1 equipped with an appropriate network capability.

Where the cursor is positioned to one of the highlighted character string parts in the caption being displayed so that the cursor position is selected, there may be varieties of manners in which to display the user interface video or to execute the switchover between displays or between operations on the portable content player 1. The ways in which the user interface video displays were shown to be switched with regard to artist names, album titles or song titles, as discussed above in reference to FIGS. 6A through 6F, are examples and may be replaced by alternative arrangements. For example, when the highlighted character string part indicating an album title is selected as shown in FIG. 6C, the songs contained in that album may be reproduced in a predetermined order (together with reproduction status display).

As another alternative, when the highlighted character string part indicating an artist name is selected as shown in FIG. 6A, the user interface video may simply display the number of the songs by the artist A in question (i.e., audio file count) currently stored in the portable content player 1, instead of the relatively detailed information such as an album list.

When an album list is displayed as shown in FIG. 6B or a song title list is displayed as depicted in FIG. 6D, the album titles or song titles may be presented in the default order, such as alphabetical order or the sequence in which the songs are recorded on the album. If, as is often the case, the metadata about the stored audio files includes degrees of the user's preference for the stored songs, then the metadata may be utilized as the basis for rearranging the album titles or song titles illustratively in descending order of the degrees of the user's preference for (or interest in) the stored albums or songs.

The information processing apparatus to which the present invention is applied is not limited to the portable content player such as one discussed above. Alternatively, the invention may be applied to mobiles phones capable of storing and reproducing audio/video contents and of receiving one-segment TV broadcasting, among others. Furthermore, the present invention is not limited to portable equipment or appliances. Illustratively, the invention may be applied to car audio equipment or desk-top type appliances. In such cases, the TV reception capability of the information processing apparatus is not limited to the handling of one-segment broadcasting. The information processing apparatus of an embodiment of the invention may then be designed to address ordinary digital or analog terrestrial broadcasting, satellite broadcasting, CATV broadcasting, and radio broadcasting.

It should be understood by those skilled in the art that various modifications, combinations, sub-combinations and alterations may occur depending on design requirements and other factor in so far as they are within the scope of the appended claims or the equivalents thereof.

What is claimed is:

1. An information processing apparatus comprising:
a display control component configured to display on a display component a picture based on a video signal and a caption synchronized with said picture and based on caption information attached to said video signal;
a character string information acquisition component configured to:
when the display control component displays the picture based on the video signal and the caption synchronized with the picture on the display component, compare a text of the caption displayed on the display component to at least one attribute item of music contents stored in a storage component to acquire common character string information, the common character string information being included in the caption displayed on the display component and in the at least one attribute item of the music contents stored in the storage component;
wherein said display control component is configured to, when the caption comprises the common character string information matching the at least one attribute item of the music contents, indicate the common character string information in the caption;
an operation execution control component configured to, in response to an indication of selection of at least a portion of the common character string information indicated in the caption, perform an operation with respect to the selected portion;
a video signal recording control component configured to record to a predetermined storage component said video signal; and
a deletion component configured to delete said video signal recorded in said predetermined storage component upon completion of the recording started by said video signal recording control component.

2. The information processing apparatus according to claim 1, wherein said operation execution control component executes said operation in a manner causing said display component to display a list of the music contents of which the at least one attribute corresponds to the selected portion of said common character string information.

3. The information processing apparatus according to claim 1, further comprising a reproduction output component configured to reproduce and output at least some of said music contents from said storage component;
wherein said operation execution control component causes said reproduction output component to reproduce and output music content identified by at least one attribute that corresponds to the selected portion of said common character string information.

4. The information processing apparatus according to claim 1, further comprising:
a broadcast reception component configured to acquire said video signal furnished with said caption information;
wherein the video signal recording control component is configured to start recording to the predetermined storage component said video signal acquired by said broadcast reception component if a predetermined operation is executed by said operation execution control component while said picture based on said video signal and said caption based on said caption information are being output and displayed on said display component in accordance with said caption information attached to said video signal acquired by said broadcast reception component.

5. The information processing apparatus according to claim 4, further comprising a reproduction control component for use following said predetermined operation executed by said operation execution control component, said reproduction control component being configured to reproduce said picture based on said video signal recorded by said video signal recording device upon resumption of the display and output of said picture based on said video signal provided by a broadcast station of which the video signal had been output and displayed until said predetermined operation was started.

6. The information processing apparatus according to claim 4, wherein said video signal recording control component ends the started recording when a predetermined end condition is deemed to be met.

7. The information processing apparatus according to claim 4, wherein said video signal recording control component ends the started recording if, with no reproduction executed by said reproduction control component, a program represented by said video signal acquired by said broadcast reception component has come to a program end time.

8. The information processing apparatus according to claim 6, wherein said video signal recording control component ends the started recording if, as said predetermined end condition, a predetermined time period is deemed to have elapsed since said video signal acquired by said broadcast reception component started to be recorded to said predetermined storage component, with no reproduction executed by said reproduction control component.

9. An information processing apparatus comprising:
a display control component configured to display on a display component a picture based on a video signal and a caption synchronized with said picture and based on caption information attached to said video signal;

a character string information acquisition component configured to:

when the display control component displays the picture based on the video signal and the caption synchronized with the picture on the display component, compare a text of the caption displayed on the display component to at least one attribute item of music contents stored in a storage component to acquire common character string information, the common character string information being included in the caption displayed on the display component and in the at least one attribute item of the music contents stored in the storage component;

wherein said display control component is configured to, when the caption comprises the common character string information matching the at least one attribute item of the music contents, indicate the common character string information in the caption;

an operation execution control component configured to, in response to an indication of selection of at least a portion of the common character string information indicated in the caption, perform an operation with respect to the selected portion;

a broadcast reception component configured to acquire said video signal furnished with said caption information;

a video signal recording control component configured to start recording to a predetermined storage component said video signal acquired by said broadcast reception component if a predetermined operation is executed by said operation execution control component while said picture based on said video signal and said caption based on said caption information are being output and displayed on said display component in accordance with said caption information attached to said video signal acquired by said broadcast reception component;

a deletion component configured to delete said video signal recorded in said predetermined storage component upon completion of the recording started by said video signal recording control component, wherein said video signal recording control component ends the started recording when a predetermined end condition is deemed to be met.

10. An information processing method comprising:

displaying on a display component a picture based on a video signal and a caption synchronized with said picture and based on caption information attached to said video signal;

when the picture based on the video signal and the caption synchronized with the picture is displayed on the display component, comparing a text of the caption displayed on the display component to at least one attribute item of music contents stored in a storage component to acquire common character string information that is included in the caption displayed on the display component and in the at least one attribute item of the music contents stored in the storage component, wherein said displaying on said display component of said caption comprises indicating the common character string information in the caption when the caption comprises the common character string information matching the at least one attribute item of the music contents;

in response to an indication of selection of at least a portion of the common character string information indicated in the caption, performing an operation with respect to the selected portion;

recording the video signal to a predetermined storage component; and deleting the video signal recorded in the predetermined storage component upon completion of the recording.

11. The information processing method according to claim 10, wherein:

the at least one attribute item of the music contents comprises a song title, an artist name, and/or an album title.

12. The information processing method according to of claim 10, wherein:

the storage component is included in a user device; and the common character string information matching the at least one attribute item is highlighted in the caption to indicate that the music contents associated with the at least one attribute item are stored in the storage component of the user device.

13. The information processing method according to of claim 12, wherein:

the user device comprises a portable content player.

14. The information processing method according to of claim 10, further comprising:

reproducing and outputting the music contents from the storage component, wherein the music contents are identified by the at least one attribute item.

15. A storage device storing a computer-executable program for, when executed by a computer, causing the computer to perform a method comprising:

displaying on a display component a picture based on a video signal and a caption synchronized with said picture and based on caption information attached to said video signal;

when the picture based on the video signal and the caption synchronized with the picture is displayed on the display component, comparing a text of the caption displayed on the display component to at least one attribute item of music contents stored in a storage component to acquire character string information that is included in the caption displayed on the display component and in the at least one attribute item of the music contents stored in the storage component; wherein said displaying on said display component of said caption comprises indicating the common character string information in the caption when the caption comprises the character string information matching the at least one attribute item of the music contents;

in response to an indication of selection of at least a portion of the common character string information indicated in the caption, performing an operation with respect to the selected portion;

recording the video signal to a predetermined storage component; and deleting the video signal recorded in the predetermined storage component upon completion of the recording.

* * * * *